(12) United States Patent
Ma et al.

(10) Patent No.: US 8,428,370 B2
(45) Date of Patent: Apr. 23, 2013

(54) APPARATUS FOR PROVIDING DIGITAL CONTENTS AND METHOD THEREOF

(75) Inventors: Jinsuk Ma, Daejeon (KR); Sunja Kim, Daejeon (KR); Hosang Ham, Daejeon (KR); Chaekyu Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 760 days.

(21) Appl. No.: 12/581,425

(22) Filed: Oct. 19, 2009

(65) Prior Publication Data

US 2010/0135577 A1 Jun. 3, 2010

(30) Foreign Application Priority Data

Dec. 1, 2008 (KR) .................... 10-2008-0120407

(51) Int. Cl.
*G06K 9/68* (2006.01)
(52) U.S. Cl.
USPC .......................................... 382/218
(58) Field of Classification Search ............... 382/209, 382/218, 190, 298, 282
See application file for complete search history.

(56) References Cited

U.S. PATENT DOCUMENTS

| | | | |
|---|---|---|---|
| 7,324,462 B1 * | 1/2008 | Page et al. .................... 370/255 |
| 7,606,837 B2 * | 10/2009 | Shields et al. ........................ 1/1 |
| 8,073,275 B2 * | 12/2011 | Shatz et al. .................... 382/239 |
| 8,086,253 B1 * | 12/2011 | Kalamkar et al. ............ 455/466 |
| 2004/0090528 A1 | 5/2004 | Miyamoto |
| 2004/0107447 A1 | 6/2004 | Katagishi et al. |
| 2005/0021559 A1 | 1/2005 | Usuda |

FOREIGN PATENT DOCUMENTS

| | | |
|---|---|---|
| CN | 1537296 | 10/2004 |
| CN | 101000623 | 7/2007 |
| JP | 2001-238108 | 8/2001 |
| JP | 2001-298717 | 10/2001 |
| JP | 2003-274381 | 9/2003 |
| JP | 2006-244213 | 9/2006 |
| JP | 2006-259893 | 9/2006 |
| JP | 2007-116270 | 5/2007 |
| JP | 2007-209001 | 8/2007 |
| KR | 10-2007-0059632 | 6/2007 |

OTHER PUBLICATIONS

Japanese Office Action dated Feb. 10, 2012 issued in corresponding Japanese Patent Application No. 2009-238039.

* cited by examiner

*Primary Examiner* — Daniel Mariam
(74) *Attorney, Agent, or Firm* — Staas & Halsey LLP

(57) ABSTRACT

The present invention relates to an apparatus for providing digital contents that acquires image data by photographing a user terminal intending to receive digital contents and discriminates a type of user terminal through the acquired image data. The present invention can simply and conveniently perform the process of discriminating a user terminal that is cumbersomely and complexly performed in the apparatus for providing contents according to the related art by the user that is not familiar with the use of the IT devices.

13 Claims, 5 Drawing Sheets

APPARATUS FOR PROVIDING DIGITAL CONTENTS AND METHOD THEREOF

RELATED APPLICATIONS

The present application claims priority to Korean Patent Application Serial Number 10-2008-0120407, filed on Dec. 1, 2008, the entirety of which is hereby incorporated by reference.

BACKGROUND OF THE INVENTION

1. Field of the Invention

The present invention relates to an apparatus for providing digital contents capable of discriminating a user terminal by acquiring image data and a method of discriminating a user terminal. More specifically, the present invention relates to an apparatus for providing digital contents that acquires image data by photographing a user terminal intending to receive digital contents, discriminates the type of user terminals through the acquired image data, converts the digital contents to meet the user terminal, and provides the converted digital contents to the user terminal and a method of discriminating a user terminal.

2. Description of the Related Art

Currently, a mobile telephone, which represents a personal communication device, has various additional functions in various types. The mobile telephone already includes a high pixel camera phone, a digital multimedia broadcasting (DMB) receiving function, etc. In particular, the mobile telephone already has a file viewer or a text viewer that is included in an existing smart phone, etc. Further, the mobile phone has functions such as a moving picture player, an MP3 player, etc. which are already widely used in the representative mobile terminal. Meanwhile, a personal multimedia player (PMP) includes a wireless communication device such as an HSDPA modem or a wireless LAN device in addition to a moving picture and music reproducing function, a text viewer function, a navigation function, etc. and an Internet browser that is software, such that it has a function of wirelessly accessing Internet. The i-Pod Touch available from Apple Co., etc., has various moving picture and music reproducing functions, a slide show function, etc. and accesses the Internet by its own wireless LAN function in order to provide a function that allows purchase digital contents online. In the following description, a personal media reproducing device having basic functions such as the foregoing multimedia reproducing function, the file viewer, etc. and a computing device, which will be available on the market in the future, are collectively referred to as a portable media system (PMS).

Generally, the PMS is implemented by a computing system with various specifications. In order to implement the PMS, a variety of systems on chip (SoCs), digital signal processors (DSPs), etc. has been actually used and a main memory and a sub-memory also having various capacities and types according to the specification of the PMS.

Representatively, as the main memory, an SDRAM has been the most widely used up to now and as the sub-memory, a non-volatile flash memory has been the most widely used. Until now, since a reading/writing speed of the flash memory cannot correspond to a reading/writing speed of the SDRAM, the SDRAM is required to rapidly execute programs and two memory parts are required. However, the performance of a flash memory is improved, such that a system having only a flash memory is naturally expected to launch on the market.

Generally, the PMS use many various display devices, which is a natural consequence due to different PMS makers or usages. This includes a mobile telephone, which have various display devices for each different type of mobile telephones. The smart phone or the PDA generally has a display device relatively larger than that of the mobile telephone for the purpose of a user interface. A game machine or a PMP has many various sized display devices in order to represent features of products for each maker that manufactures each device.

As described above, the current PMSs have different sizes and resolution of a display device, different color levels, reproducing capability of a computing system, etc. Therefore, in order to use various PMSs, there are problems in that a user should recognize information on the devices, which are owned by the user, and the user's PMS device should secure reproducible contents. For example, there may occur a case where moving pictures, which can be reproduced by a PDA from 'A' Co. using Windows mobile operating system from Microsoft Co., cannot be reproduced by a PMP device manufactured by 'B' Co.

In other words, each PMS device may be configured of different hardware according to a maker or a type of device and an operating system operating the PMS devices may also be different according to a maker or a type of device. In addition, a type of codec to support the multimedia reproduction in each PMS device is also different and the size and specification of the display device displaying the finally calculated image may be different. Therefore, there may be a situation where the compatibility of usable contents between different PMSs is very low. In this situation, the user confirms the specifications of the PMS devices owned by the user one at a time in order to acquire contents suitable for his/her PMS and then uses the contents conversion software suitable for the specifications to convert and acquire the contents.

Meanwhile, the various PMSs described above have been subjected to various technical evolving processes and rapidly expanded to a public. According to this tendency, apparatuses for providing digital contents in order to provide or sell multimedia contents, such as various movies, dramas, music videos, e-books, etc., which are sold online, to the PMS offline, have been developed.

The apparatus for providing digital contents described above is installed inside or outside a room where there are a plurality of users and receives the corresponding digital contents from a central server using a pre-stored wired data network according to a request of a user and transmits them to a user terminal. As a result, the apparatus for providing digital contents is an apparatus for charging a fee. The apparatus for providing digital contents provides contents data to the mobile device of the user without separately paying a fee for the use of the packet. As a result, the user can be conveniently provided with the digital contents at a desired location at lower price than a case where the user is provided with the digital contents through wireless Internet services of existing mobile operators.

FIG. 1 is a diagram for schematically explaining a configuration of an apparatus for providing digital contents according to the related art.

A general apparatus for providing digital contents includes: an input unit 10 that receives user selection or information on a user terminal owned by a user; a display unit 12 that displays a providable contents history to the user; a content converter 16 that converts stored contents to meet the user terminal; a content storage unit 18 that stores various multimedia contents; and a controller 14 that controls each unit so that the contents selected by the user can be converted to meet the user terminal and transmitted to the user terminal.

A process of purchasing contents when a user purchases contents in the apparatus for providing contents having the above configuration will be described below. First, the user should input information (for example, model name) on the mobile terminal owned by the user through the input unit 10. The reason is that there are various types of mobile terminals as described above. Further, this is to convert the contents selected by the user to meet the mobile terminal of the user and provide them. For example, in the case of the mobile telephone, an LCD screen has very various resolutions such as 800*600, 640*480, 320*240, etc., according to a maker or a model.

In order to smoothly reproduce the contents downloaded from the apparatus for providing contents in the user mobile terminal, the downloaded contents undergo a conversion process such as transcoding, etc. in order to meet each terminal. If the downloaded contents do not undergo the conversion process, fatal problems occur in that the mobile terminal of the user is reset or the system goes down due to the downloaded contents. The transcoding technology actually used to convert the contents is very technologically complicated due to various input parameters, such as a wide moving picture codec, a digital right management (DRM) technology, etc.

Therefore, the apparatus for providing contents should know the information (for example, model name) beforehand on the user terminal in order to correspond to the mobile terminal of the user having different hardware and software specifications. At this time, assume that the hardware and software specifications corresponding to the model name of the user terminal are previously determined.

The apparatus for providing contents according to the related art directly uses a method that receives the model name of the terminal from the user or provides the information (for example, model name) on various terminals for each maker and receives the user selection in order to achieve the foregoing description, that is, to discriminate the specification (hardware and software specifications) of the user terminal. In order to use the method, the user should know beforehand the detailed information on the terminal owned by the user.

However, it is difficult for users who are not familiar with the use of the IT devices, to know the detailed information of the terminals owned by the users. Further, there occurs a case where the user abandons the purchase of the contents before finishing a trouble process of discriminating the user terminal by the apparatus for providing contents. This is the main factor that hinders the activation of the apparatus for providing contents.

SUMMARY OF THE INVENTION

The present invention proposes to solve the above problems. It is an object of the present invention to provide an apparatus for providing contents capable of simply and conveniently performing a process of discriminating a user terminal in the apparatus for providing contents when a user uses the apparatus for providing contents by acquiring image data by photographing a user terminal and reading the image data to automatically discriminate a type of user terminal and a method of discriminating a user terminal.

There is provided an apparatus for providing digital contents that discriminates a user terminal by acquiring image data according to the present invention, including: a photographing unit that photographs a user terminal to acquire the image data; an image processor that digitalizes the image data acquired by the photographing unit and converts the digitalized image data into a predetermined format; an image comparator that compares the converted image data with the pre-stored image data pre-stored of various terminals and extracts identification information of a target terminal that is determined to be the same or similar; and a terminal discriminator that requests user confirmation based on the identification information of the target terminal and receives user selection accordingly to discriminate the user terminal.

The image comparator extracts feature points from the converted image data and compares the feature points with feature points extracted from the image data of various terminals to determine the target terminal.

The image comparator calculates probability information representing a matching degree of the target terminal and the user terminal and transmits it to the terminal discriminator and the terminal discriminator requests the user confirmation based on the identification information of the target terminal and the probability information of the target terminal.

The identification information of the target terminal includes at least one of a model name of the target terminal and the image data of the target terminal. The apparatus for providing digital contents further includes a download manager that requests an original copy of the contents to an external server for providing contents when the contents requested by the user is not stored internally.

The apparatus for providing digital contents further includes a terminal information manager that receives the identification information of the target terminal selected by the user and extracts the profile information of the corresponding terminal.

Further, the profile information includes at least one of an image compression format supported by the terminal, a spare storage space size of the terminal, screen information on the terminal, the type of document supported by the terminal, a moving picture compression format supported by the terminal, a main memory size of the terminal, CPU information on the terminal, platform and library version information included in the terminal, and types of libraries included in the terminal.

There is provided a method of discriminating a user terminal by acquiring image data in an apparatus for providing digital contents according to the present invention, including: photographing a user terminal to acquire the image data; digitalizing the image data and converting the digitalized image data into a predetermined format; comparing the converted image data with the pre-stored image data of various terminals and extracting identification information of a target terminal that is determined to be the same or similar; and requesting user confirmation based on the identification information of the target terminal and receiving user selection to discriminate the user terminal.

Extracting the identification information of the target terminal determined to be similar or the same by comparing the converted image data with the pre-stored image data of various terminals extracts feature points from the converted image data and compares the feature points with feature points extracted from the image data of various terminals to determine the target terminal.

The method of discriminating a user terminal further includes calculating the probability information represented as the matching degree of the target terminal and the user terminal, wherein discriminating the types of user terminals request the user confirmation based on the identification information and probability information on the target terminal.

The identification information of the target terminal includes at least one of a model name of the target terminal and the image data of the target terminal. The method of discriminating a user terminal further includes requesting an original copy of the contents to an external server providing contents when the contents requested by the user are not stored internally.

The method of discriminating a user terminal further includes receiving the identification information of the target terminal selected by the user and extracting the profile information of the corresponding terminal.

The following effects can be obtained by the present invention.

The present invention can conveniently perform the process of discriminating the user terminal that should be first performed when the user purchases the contents in the apparatus for providing contents. In other words, the present invention can simply and conveniently perform the process of discriminating a user terminal that is cumbersomely and complexly performed in the apparatus for providing contents according to the related art by the user that is not familiar with the use of IT devices. Therefore, the present invention can remarkably improve the purchase efficiency of the digital contents in the apparatus for providing contents as well as easily provide various multimedia contents to many users through the activation of the apparatus for providing contents.

DETAILED DESCRIPTION OF THE PREFERRED EMBODIMENTS

Figure 1:
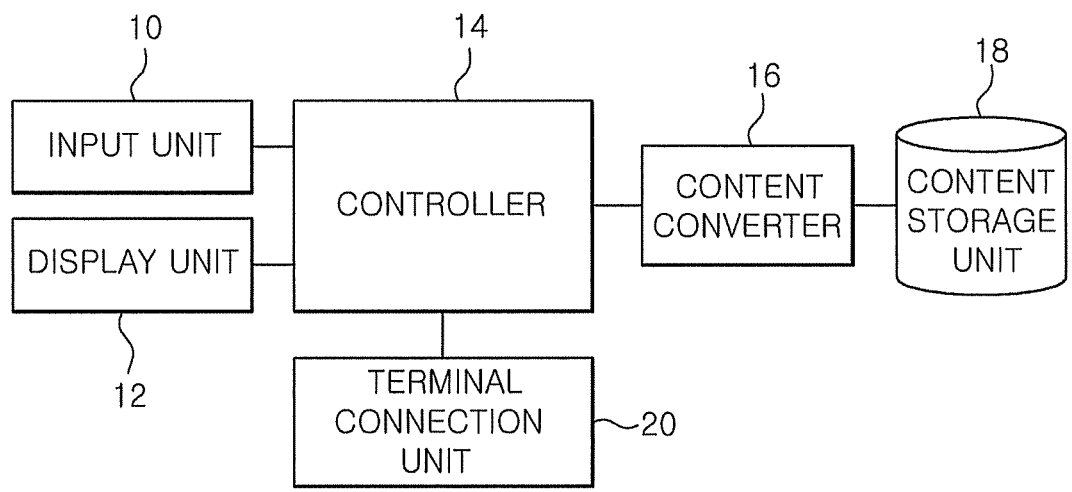
FIG. 1 is a diagram for schematically explaining a configuration of an apparatus for providing digital contents according to the related art.

The present invention will be described below with reference to the accompanying drawings. Herein, the detailed description of a related known function or configuration that may make the purpose of the present invention unnecessarily ambiguous in describing the present invention will be omitted Exemplary embodiments of the present invention are provided so that those skilled in the art may more completely understand the present invention. Accordingly, the shape, the size, etc., of elements in the drawings may be exaggerated for explicit comprehension.

Hereinafter, preferred embodiments of the present invention will be described in detail with reference to the accompanying drawings.

Figure 2:
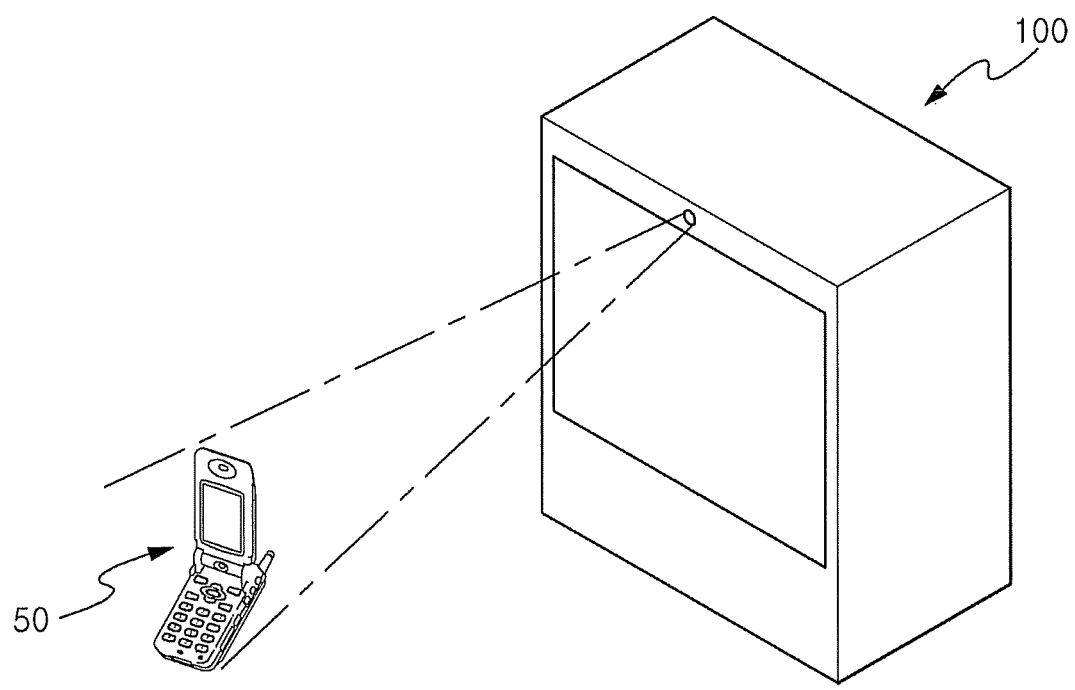
FIG. 2 is a reference diagram for explaining an apparatus for providing digital contents that discriminates a user terminal by acquiring image data according to the present invention.
Figure 3:
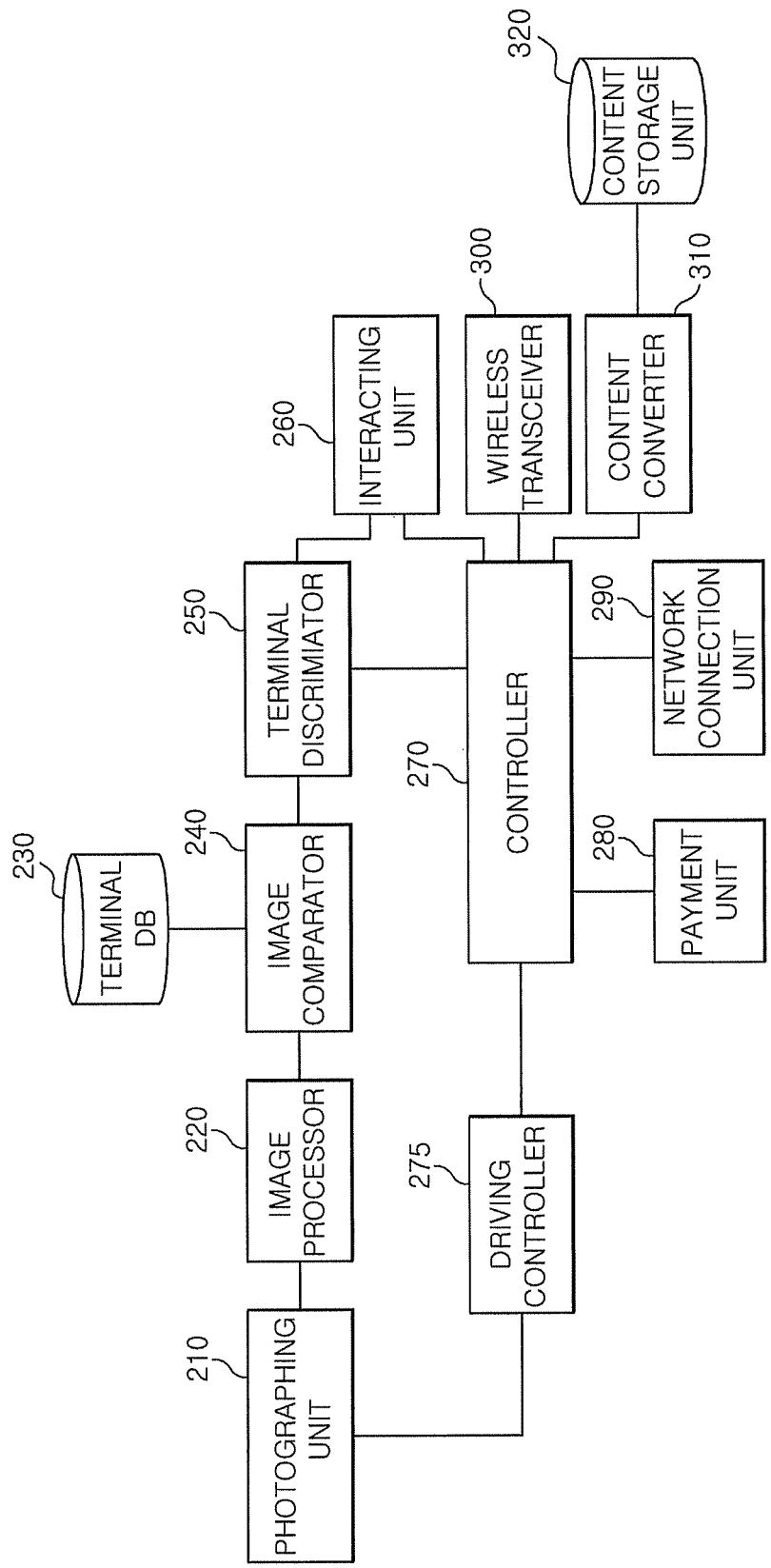
FIG. 3 is a diagram for explaining in detail of a configuration of the apparatus for providing digital contents according to the present invention.

FIG. 2 is a reference diagram for explaining an apparatus for providing digital contents that discriminates a user terminal by acquiring image data according to the present invention. FIG. 3 is a diagram for explaining in detail a configuration of the apparatus for providing digital contents according to the present invention.

An apparatus for providing digital contents that discriminates a user terminal by acquiring image data according to the present invention includes a photographing unit 210, an image processor 220, a terminal database 230, an image comparator 240, a terminal discriminator 250, an interacting unit 260, a controller 270, a driving controller 275, a payment unit 280, a network connection unit 290, a wireless transceiver 300, a content converter 310, and a content storage unit 320.

The photographing unit 210 acquires the image data by photographing the shape of the user terminal so as to discriminate the of user terminal. As shown in FIG. 2, the photographing unit 210 is installed on one side of an apparatus 100 for providing contents according to the present invention to photograph a user terminal 50 that intends to use the apparatus for providing contents. The photographing unit 210 may be implemented using a charge coupled device (CCD) camera or a complementary metal oxide semiconductor (CMOS) camera.

The image processor 220 receives the image data acquired by the photographing unit 210, converts the received image data into a digital format, and converts it into a predetermined format. Herein, the image processor 220 converts the format of digitalized image data in order to meet a requested format in the image comparator 240 to be described below. The image processor 220 can be implemented by hardware or software. For example, there is a method of using Frame Grabber, which is an example of the hardware.

The terminal database 230 (hereinafter, referred to as 'terminal DB') stores the image data and identification information of various portable terminals published on the market. In more detail, the terminal DB 230 extracts feature points from the image data of various personal terminals, matches it with the identification information (for example, model name) on each personal terminal, and stores the matched information. Herein, the portable terminal where the image information is stored in the terminal DB 230 basically includes a memory for storing the digital contents and includes all the personal media reproducing devices having a multimedia reproducing function, a music reproducing, a file viewer function, etc.

The image comparator 240 receives the image data that is digitalized from the image processor 220 and converted into a predetermined format to extract the feature points. The image comparator 240 extracts the feature points from the received image data from the image processor 220 and mutually compares and analyzes the extracted feature points with the feature points of various portable terminals stored in the terminal DB 230 to extract the identification information (for example, model name) of the terminal (hereinafter, referred to as 'target terminal') determined to be similar or the same and transmits it to the terminal discriminator 250. Further, the image comparator 240 calculates the probability information represented as the matching degree of the target terminal determined to be similar or the same and the user terminal to transmit it to the terminal discriminator 250. At this time, the image comparator 240 compares the image data of the user terminal with the image data of various portable terminals stored in the terminal DB 230 and can use known various comparing and analyzing algorithms to determine the target terminal.

The terminal discriminator 250 receives the identification information and probability information of the target terminal from the image comparator 240 and requests the user confirmation based thereon and receives the user selection accordingly to determine the type of user terminal. In more detail, the terminal discriminator 250 receives the identification information and probability information of the target terminal determined to be similar or the same as the user terminal in the image comparator 240, such that it can display the received identification information and probability information to the user through the interacting unit 260. At this time, the terminal discriminator 250 further receives the image data of the portable terminal determined to be the target terminal from the terminal DB 230, such that it can display the received image data to the user through the interacting unit 260. Preferably, the interacting unit 260 is implemented by a unit that can display the output results to the user and receive the user selection accordingly, for example, a touch screen.

The terminal discriminator 250 queries the user whether the target terminal determined in the image comparator 240 matches the actual user terminal through the interacting unit 260. The terminal discriminator 250 receives the user selection through the interacting unit 260 to finally determine the type of user terminal. At this time, when the target terminal displayed through the interacting unit 260 does not match the actual user terminal (that is, there is no terminal matching the user terminal among the displayed target terminals), the terminal discriminator 250 requests the controller 270 to photograph the user terminals again.

The driving controller 275 controls the photographing unit 210 according to the control signal from the controller 270, such that the photographing unit 210 can photograph the user terminal and obtain the image data.

The payment unit 280 is a unit that charges a fee for contents purchased by the user and can charge a fee through the existing used various methods, such as cash, card, E-money, mobile phone payment, etc.

The network connection unit 290 is connected to external storage media, such as an external central server, etc., such that it can receive the digital contents, which do not exist internally, from the external. The apparatus for providing contents according to the present invention is connected to the external Internet, such that it can use an existing Internet service supplier network.

The wireless transceiver 300 provides a function capable of wirelessly downloading contents purchased by the user according to the apparatus for providing contents according to the present invention. As a method for implementing this, various wireless communication methods can be used. As representative wireless communication methods, methods such as Bluetooth, WiFi that is a wireless LAN, etc. can be used.

The controller 270 controls each unit, making it possible to implement the present invention. The detailed description of the controller 270 will be described in detail with reference to FIG. 4.

The content converter 310 converts contents selected by the user according to the control signal from the controller 270 to meet the type of user terminal and provides the converted contents.

The content storage unit 320 stores various multimedia contents. For example, the content storage unit 320 may store moving pictures, images, MP3 files, documents, etc.

Figure 4:
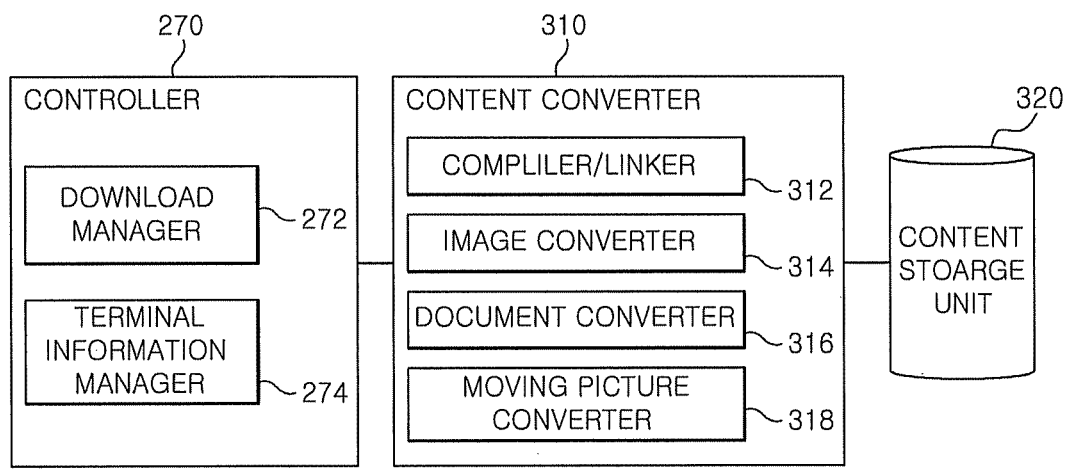
FIG. 4 is a diagram for explaining in detail a configuration of the controller 270 and the content converter 310 of FIG. 3.

FIG. 4 is a diagram for explaining in detail a configuration of the controller 270 and the content converter 310 of FIG. 3.

The controller 270 includes a download manager 272 and a terminal information manager 274.

In more detail, the download manager 272 determines whether the contents selected by the user are stored in the content storage unit 320. As the determination result, when the contents selected by the user is stored in the content storage unit 320, the download manager 272 converts the contents selected by the user through a content converter 310 and provides them to the user terminal. As the determination result, when the contents selected by the user are not stored in the content storage unit 320, the download manager 272 requests the original copy of contents to the contents providing server (not shown) and receives it through the network connection unit 290 and stores it in the content storage unit 320. The download manager 272 converts the contents selected by the user to meet the user terminal through a content converter 310 and provides them to the user terminal.

The terminal information manager 274 receives the identification information of the user terminal finally determined in the terminal discriminator 250 to extract the profile information of the corresponding terminal. The profile information of the corresponding terminal includes the image compression format supported by the terminal, the spare storage space size of the terminal, the screen information on the terminal, the type of documents supported by the terminal, the moving picture compression format supported by the terminal, the mail memory size of the terminal, the CPU information, the platform and library version information mounted in the terminal, and the type of libraries mounted in the terminal.

Table 1 represents one example of the profile information of the terminal extracted from the terminal information manager 274.

TABLE 1

| PMS Device Specification | Specification Example |
| --- | --- |
| PMS Maker | XX Electron |
| PMS Model Name | PMS-100 |
| Screen Size | 4 inches |
| Screen Resolution | 480*640 |
| Color Resolution | 65,536 Color |
| CPU Specification | Intel PXA270 |
| Built-in Memory Size | 128 MB |
| External Memory Size | 1 GB |
| Usable Wireless Transmission Scheme | Bluetooth v1.2, WiFi 802.11a/b/g |
| Maximum Reproducible FPS (frame per second) | 30 |
| Usable Memory Size | 100 MB |
| Platform version | WIPI 2.0 |
| Platform Library Version | SKTlbs1.0; SKTopenGL1.1 |
| Support Multimedia | MPEG4, H.263, MJPEG, MP3, JPEG, PNG, PDF, HTML, TXT |

The content converter 310 includes an image converter 314 that converts the contents, a document converter 316, and a moving picture converter 318 and a compiler/linker 312 for converting application programs operated in the user terminal.

The image converter 314 receives information, such as the image compression format supported by the user terminal, the spare storage space size of the user terminal, the screen information of the user terminal, etc. from the controller 270 and uses them, such that it converts the images stored in the content storage unit 320 into a form optimized for the user terminal.

The document converter 316 receives the type of documents supported by the user terminal, the spare storage space size of the user terminal, the screen information of the user terminal, etc. from the controller 270 and uses them, such that it converts the documents stored in the content storage unit 320 into a form optimized for the user terminal.

The moving picture converter 318 receives the moving picture compression format supported by the user terminal, the spare storage space size of the user terminal, the screen information of the user terminal, the main memory size of the user terminal, the CPU information etc. from the controller 270 and uses them, such that it converts the moving pictures stored in the content storage unit 320 into a form optimized for the user terminal.

The compiler/linker 312 receives the platform and library version information mounted in the user terminal 312, a type of the mounted libraries, the mail memory size of the user terminal, the CPU information, the screen information of the user terminal, etc. from the controller 270 and uses them, such that it performs an operation of building the contents stored in the content storage unit 320 again.

By the above processes, the contents suitably converted for the user terminal are stored in the content storage unit 320 according to the process of the controller 270 or are deleted after the used period ends or due to other conditions.

As another use of the present invention, it is natural that the download manager 272 of the controller 270 can transmit the profile information of the user terminal to the contents providing server (not shown) without converting the contents in the content converter 310, convert the contents in the contents providing server, and provide them to the apparatus for providing contents according to the present invention.

Figure 5:
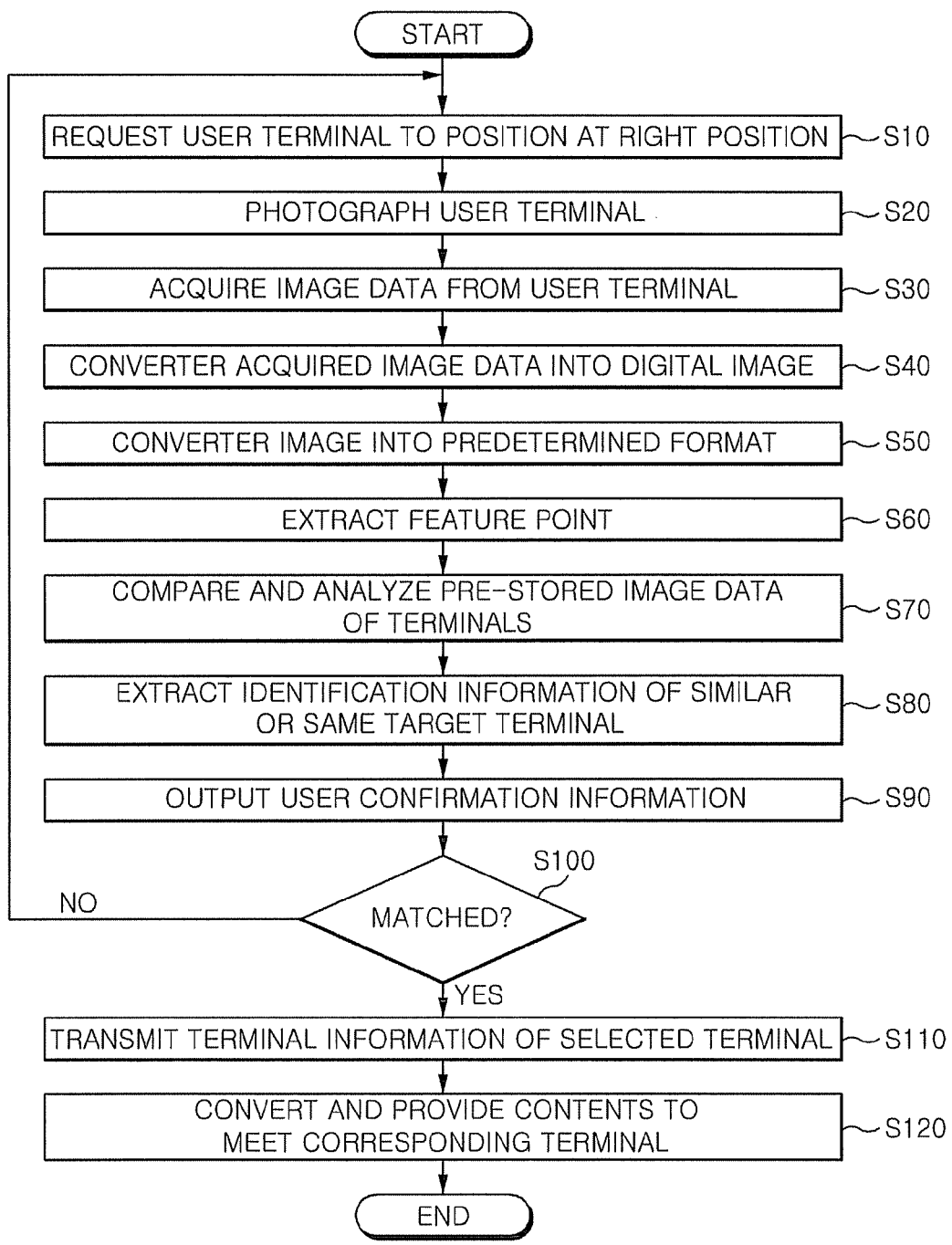
FIG. 5 is a flowchart for explaining a method of discriminating a user terminal by acquiring the image data in the apparatus for providing digital contents according to the present invention.

FIG. 5 is a flowchart for explaining a method of discriminating a user terminal by acquiring the image data in the apparatus for providing digital contents according to the present invention.

Referring to FIG. 5, the apparatus for providing contents according to the present invention requests the user to move the user terminal and position it to the position where it can be photographed (S10).

When the user terminal is positioned to the position where it can be photographed, the apparatus for providing contents according to the present invention photographs the user terminal to acquire the image data of the user terminal (S20).

Next, it converts the image data acquired at step S20 into a digital image (S30).

It converts the image data, which has been converted into a digital image at step S30, into a predetermined format (S40).

Next, it receives the image data digitalized and converted into the predetermined format at step S40 and extracts feature points (S60). In more detail, it extracts feature points from the image data of the user terminal and mutually compares and analyzes the extracted feature points with pre-stored feature points of various portable terminals (S70). It extracts the identification information (for example, model name) of the terminal (hereinafter, referred to as "target terminal") determined to be similar or the same (s80). At this time, it compares the image data of the user terminal with the pre-stored image data of various portable terminals, thereby making it possible to use known various comparing and analyzing algorithms in order to determine the target terminal.

At step S80, it extracts the identification information of the target terminal determined to be similar or the same and further calculates the probability information representing the matching degree of the target terminal determined to be the same or similar and the user terminal.

If the identification information of the target terminal is extracted and the probability information of the target terminal is calculated at step S80, it requests the user confirmation to confirm whether it matches the user terminal, based on the identification information and probability information of the target terminal (S100). The user confirming step can be displayed the received identification and probability information to the user. Further, the image data of the target terminal can display the image data together with the identification information and probability information, such that the foregoing user confirmation process can be intuitively performed. In other words, the identification information, probability information, and image data of the target terminal is displayed to the user and query the user whether it matches the actual user terminal.

At step S100, when there is a terminal (target terminal) matching the user terminal, it extracts the profile information of the corresponding terminal based on the identification information of the corresponding terminal. It transmits the extracted profile information to the content converter, such that the content converter converts the contents to be suitable for the user terminal (S110). The content converter receives the profile information of the user terminal and converts the contents to meet the user terminal and then provides the contents stored in the content storage unit to the user terminal.

At step S100, when no selected terminal (target terminal) matches the user terminal, it photographs the user terminal again and repeats the foregoing processes.

According to the foregoing description, the user can conveniently perform the process of discriminating the user terminal that should be first performed when the user purchases the contents in the apparatus for providing contents. In other words, the present invention can simply and conveniently perform the process of discriminating a user terminal that should be cumbersomely and complexly performed in the apparatus for providing contents according to the related art by the users that are not familiar with the use of the IT devices. Therefore, with the method of discriminating a user terminal according to the present invention, it is expected that the purchase efficiency of the digital contents in the apparatus for providing contents can be remarkably improved as well as various multimedia contents can be provided to many users through the activation of the apparatus for providing contents (so-called 'contents vending machine').

Some steps of the present invention can be implemented as a computer-readable code in a computer-readable recording medium. The computer-readable recording media include all types of recording apparatuses in which data that can be read by a computer system is stored. Examples of the computer-readable recording media include a ROM, a RAM, a CD-ROM, a CD-RW, a magnetic tape, a floppy disk, an HDD, an optical disk, an optical magnetic storage device, etc. and in addition, include a recording medium implemented in the form of a carrier wave (for example, transmission through the Internet). Further, the computer-readable recording media are distributed on computer systems connected through the network, and thus the computer-readable recording media may be stored and executed as the computer-readable code by a distribution scheme.

As described above, the preferred embodiments have been described and illustrated in the drawings and the description. Herein, specific terms have been used, but are just used for the purpose of describing the present invention and are not used for defining the meaning or limiting the scope of the present invention, which is disclosed in the appended claims. Therefore, it will be appreciated to those skilled in the art that various modifications are made and other equivalent embodiments are available. Accordingly, the actual technical protection scope of the present invention must be determined by the spirit of the appended claims.

What is claimed is:

1. An apparatus for providing digital contents, comprising:
    a photographing unit that photographs a user terminal to acquire image data; an image processor that digitalizes the image data acquired by the photographing unit and converts the digitalized image data into a predetermined format;
    an image comparator that compares the converted image data with image data of various terminals pre-stored in the predetermined format and extracts identification information of a target terminal that is determined to be the same or similar; and a terminal discriminator that queries a user whether the target terminal determined to be the same or similar in the image comparator matches the user terminal based on the identification information of the target terminal and receives user selection accordingly to finally discriminate a type of the user terminal.

2. The apparatus for providing digital contents according to claim 1, wherein the image comparator extracts feature points from the converted image data and compares the feature points with feature points extracted from the image data of various terminals to determine the target terminal.

3. The apparatus for providing digital contents according to claim 1, wherein the image comparator calculates probability information representing a matching degree of the target terminal and the user terminal and transmits it to the terminal discriminator and the terminal discriminator queries the user whether the target terminal matches the user terminal based on the identification information of the target terminal and the probability information of the target terminal.

4. The apparatus for providing digital contents according to claim 1, wherein the identification information of the target terminal includes at least one of a model name of the target terminal and the image data of the target terminal.

5. The apparatus for providing digital contents according to claim 1, further comprising a download manager that requests an original copy of the contents to an external server for providing contents when the contents requested by the user is not stored internally.

6. The apparatus for providing digital contents according to claim 1, further comprising a terminal information manager that receives the identification information of the target terminal selected by the user and extracts the profile information of the corresponding terminal.

7. The apparatus for providing digital contents according to claim 6, wherein the profile information includes at least one of an image compression format supported by the terminal, a spare storage space size of the terminal, screen information on the terminal, the type of documents supported by the terminal, a moving picture compression format supported by the terminal, a main memory size of the terminal, CPU information on the terminal, platform and library version information included in the terminal, and the types of libraries included in the terminal.

8. A method of discriminating a user terminal, comprising:

photographing a user terminal to acquire image data;

digitalizing the image data and converting the digitalized image data into a predetermined format;

comparing the converted image data with image data of various terminals pre-stored in the predetermined format and extracting identification information of a target terminal that is determined to be the same or similar; and querying a user whether the target terminal determined to be the same or similar matches the user terminal based on the identification information of the target terminal and receiving user selection accordingly to finally discriminate a type of the user terminal.

9. The method of discriminating a user terminal according to claim 8, wherein the extracting the identification information of the target terminal determined to be similar or the same by comparing the converted image data with the pre-stored image data of various terminals extracts feature points from the converted image data and compares the feature points with feature points extracted from the image data of various terminals to determine the target terminal.

10. The method of discriminating a user terminal according to claim 8, further comprising calculating the probability information representing the matching degree of the target terminal and the user terminal, wherein the discriminating the type of the user terminal queries the user whether the target terminal matches the user terminal based on the identification information and probability information on the target terminal.

11. The method of discriminating a user terminal according to claim 8, wherein the identification information of the target terminal includes at least one of a model name of the target terminal and the image data of the target terminal.

12. The method of discriminating a user terminal according to claim 8, further comprising requesting an original copy of the contents to an external server for providing contents when the contents requested by the user are not stored internally.

13. The method of discriminating a user terminal according to claim 8, further comprising receiving the identification information of the target terminal selected by the user and extracting the profile information of the corresponding terminal.

* * * * *